United States Patent [19]

Ernst et al.

[11] 4,205,885
[45] Jun. 3, 1980

[54] BALL BEARING WITH CAGE FORMED OF AXIAL SECTIONS

[75] Inventors: Horst M. Ernst, Eltingshausen; Armin Olschewski; Lothar Walter, both of Schweinfurt; Manfred Brandenstein, Aschfeld, all of Fed. Rep. of Germany

[73] Assignee: SKF Kugellagerfabriken GmbH, Schweinfurt, Fed. Rep. of Germany

[21] Appl. No.: 878,573

[22] Filed: Feb. 16, 1978

[30] Foreign Application Priority Data

Feb. 19, 1977 [DE] Fed. Rep. of Germany ... 7705155[U]

[51] Int. Cl.² ............................................. F16C 29/06
[52] U.S. Cl. .................................... 308/6 C; 64/23.7; 308/201
[58] Field of Search .............. 308/6 C, 6 B, 201, 6 R; 64/23, 23.7

[56] References Cited

U.S. PATENT DOCUMENTS

| 2,509,749 | 5/1950 | Thomson | 308/6 C |
| 3,751,121 | 8/1973 | Geffner | 308/201 |
| 3,958,678 | 5/1976 | Jeter | 308/6 C |

*Primary Examiner*—Douglas C. Butler
*Attorney, Agent, or Firm*—Daniel M. Rosen; J. David Dainow

[57] ABSTRACT

A linear-motion ball bearing has an outer sleeve and a cylindrical cage within the sleeve, with endless raceways defined by the sleeve and cage, and balls substantially filling the raceways; the cage is formed of axially-extending sections, with a gap defined between the pair of adjacent edges of each two adjacent sections, and a projection extending circumferentially from one of each pair of edges into a recess of an adjacent edge.

10 Claims, 3 Drawing Figures

BALL BEARING WITH CAGE FORMED OF AXIAL SECTIONS

BACKGROUND OF THE INVENTION

The invention relates to a linear-motion ball bearing having in the bore of the outer sleeve, axially extending loaded and return raceways for the endless paths of balls disposed in closed guideways in a cage.

Ball bearings of this type are already known, wherein the cage is usually rigidly joined to the outer sleeve. With such bearings it is difficult to manufacture and arrange the cage with sufficient precision to assure satisfactory entry of the balls into the raceways of the loaded zone. An offset between the ball guide in the cage and the raceway in the outer sleeve will cause increased bearing wear due to the impact of the balls.

Objectives of the present invention are to provide a ball bearing of the type mentioned above, which is subject to less wear and whose cage is formed by a component that can be manufactured cheaply and is easy to install.

SUMMARY OF THE INVENTION

The above-noted objectives are accomplished in that the cage is sub-divided by longitudinally or axially extending openings or the like into individual sections capable of being displaced relative to one another in the circumferential direction.

In accordance with further characteristics of the invention, the individual sections of the cage are separated from one another and form between them longitudinal gaps. There is a projection extending over the entire width of the gap and a recess of corresponding width on each side surface of a cage section, with a projection on one cage section fitting into a recess in the other cage section. The individual sections of the cage may also be connected with one another through elastic straps.

Further characteristics of the invention are described in detail below in terms of the exemplified embodiments shown in the drawings as follows.

BRIEF DESCRIPTION OF THE DRAWINGS

In the drawings of different embodiments, like parts are designated by the same reference numerals, but with an added suffix "a".

DETAILED DESCRIPTION OF THE PREFERRED EMBODIMENTS

Figure 1:
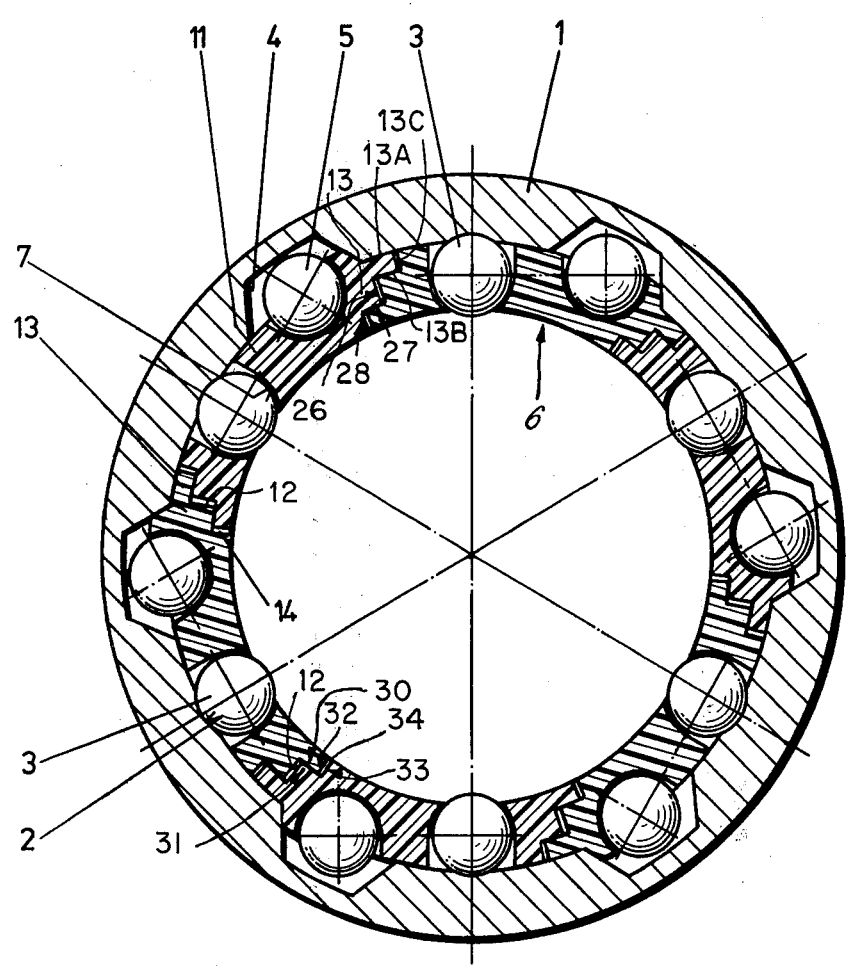
FIG. 1 is cross-sectional view of a ball bearing having a cage consisting of individual sections in accordance with the invention.
Figure 2:
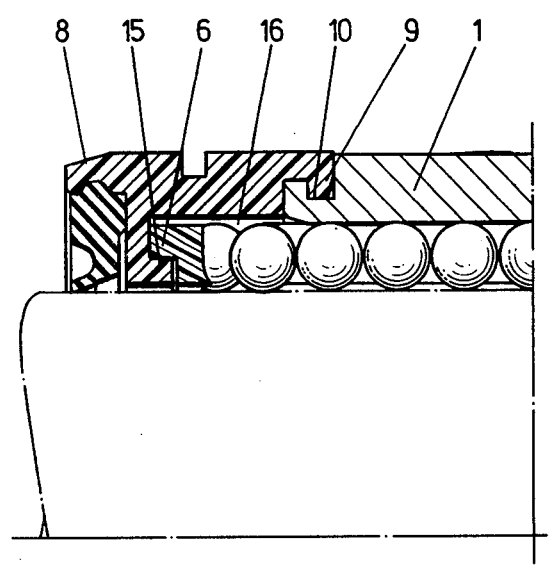
FIG. 2 shows a portion of a longitudinal cross-section of the ball bearing in accordance with FIG. 1.

The ball bearing in accordance with FIGS. 1 and 2 includes an outer sleeve 1, a cage 6, and end rings 8 the outer sleeve and cage formed as generally concentric circular cylinders. The outer sleeve has in its bore, raceways 2 for the balls 3 of the loaded zone, and return grooves or raceways 4 for the balls 5 of the unloaded or return zone. The cage is made of plastic, for example, and has axially extending guideways 7 which at the ends are connected by semicircular turn-around paths an example of which is partially shown in FIG. 2. The end-rings 8 are slipped into the sections of the cage 6 projecting beyond the outer sleeve 1; these end-rings are fastened to the outer sleeve 1 by means of molded-on elastic projections 9 which snap into annular grooves 10 at the ends of the outer sleeve 1. The loaded raceways 2 and the return grooves 4 correspond to the length of the outer sleeve 1, while the semicircular turn-around paths are located in the sections of the cage 6 which project from the outer sleeve 1; there is one turn-around path (not shown fully, but well-known in the prior art) for the adjacent ends of each pair of loaded and return raceways.

In order to compensate for an offset between the loaded raceway 2 and the guideways 7 of the cage 6, which is unavoidable due to the manufacturing tolerances of the cage 6 and the outer sleeve 1, the cage is made of individual sections 11 which in the assembled bearing can become displaced relative to one another in the circumferential direction, so that adjustment of each guideway 7 relative to the associated raceway 2 is possible. For this purpose, longitudinally extending gaps 12 are provided between the adjacent edges of adjacent cage sections 11. To seal such a gap 12, a projection 13 and a recess 14 are alternately provided on adjacent side surfaces of cage sections 11, with a projection 13 on one section 11 fitting into a recess 14 in the other section 11. Projection 13 includes circumferentially extending surfaces 13A and 13B and transverse surface 13C. Adjacent projection 13 are surfaces 26, 27, and 28 which together define three steps. Adjacent these steps are three corresponding steps. The width of the gap is variable as the cage sections are circumferentially displaceable. In the radial direction, the cage sections 11 are fixed to and centered on a revolving extension 15 of the end rings 8. In the vicinity of the reversing zones, the end rings 8 are provided with openings or ball-clearance space 16 to assure satisfactory reversal of the balls 3 and 5. A typical pair of adjacent first and second edges of adjacent cage sections comprises, respectively, first and second circumferentially extending and overlying surfaces 30 and 31 and respectively third and fourth surfaces 32 and 33, defining therebetween gap 34 extending circumferentially and axially.

Surfaces 30 and 31 provide a seal between said first and second edges. Surfaces 30 and 32 define a first of three adjacent and successive steps which engage similar mating steps of the adjacent edge.

Figure 3:
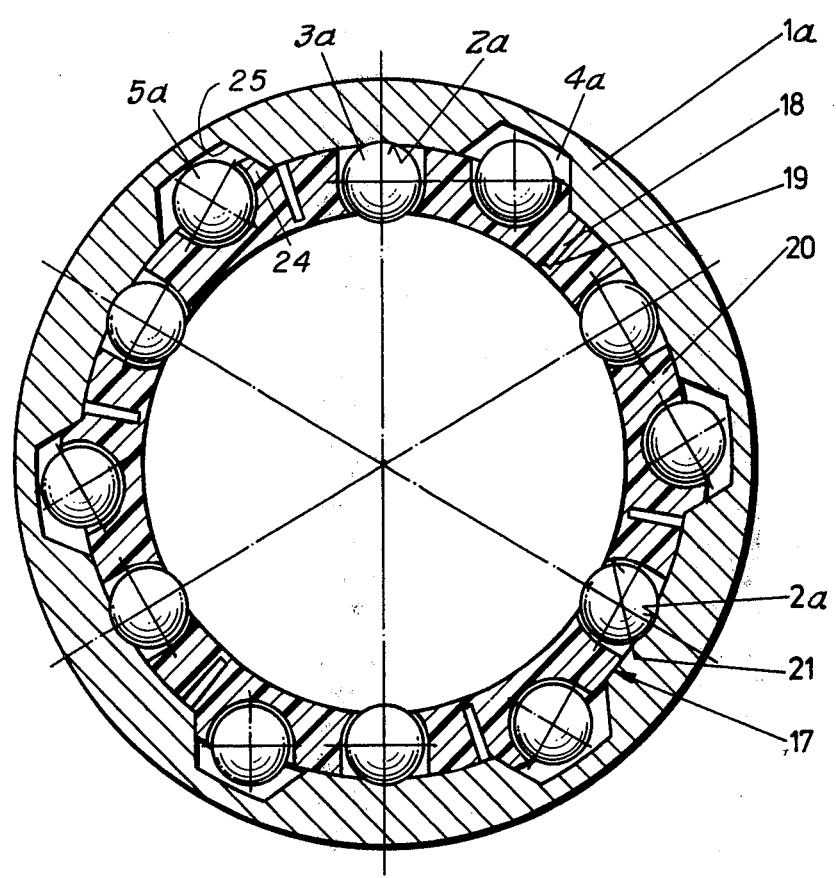
FIG. 3 is a cross-sectional view of a ball bearing having a cage in accordance with the invention, made of plastic by injection molding, in which the individual sections of the cage are connected with one another through elastic straps.

The embodiment according to FIG. 3 has an outer sleeve 1a, load raceway 2a, loaded balls 3a, return raceway 4a, unloaded balls 5a and cage 17. FIG. 3 differs from the design according to FIGS. 1 and 2, in that the cage 17 is of one piece construction, and that a longitudinally extending opening 18 is provided between every two rows of balls. This opening extends from the outer surface of the cage 17 inward to the vicinity of the cage bore, so that an elastic strap or strip 19 is all that remains between the individual cage sections 20 and the latter are capable of being slightly displaced in the circumferential direction. This also makes it possible for the guideway 21 of each individual cage section 20 to adjust itself to its associated raceway 2, thus assuring satisfactory entry of the balls 5 from the unloaded zone.

The embodiments described are merely examples of a ball bearing in accordance with the invention. Modifications of the design of the individual components may readily be made within the scope of the invention, and thus the cage 6, 17 is suited for use also with ball bearings having an outer sleeve that extends not only over the loaded and unloaded zones, but also over the reversing zones located axially beyond the loaded and unloaded raceways 2 and 4 respectively. Moreover, the end-rings 8 may be joined only to the cage sections 11 and 20, respectively. An additional feature of both embodiments shown is an axial rib 23 in FIG. 1, and 24 in FIG. 3, extending outwardly from typical cage sections into a return raceway and engaging typical axial raceway walls 24 and 25, respectively.

What is claimed is:

1. In a linear-motion ball bearing including an outer sleeve about a central axis, a cage within said sleeve, the outer sleeve and cage being concentric circular cylinders, and a plurality of endless raceways defined by said sleeve and cage, each raceway including a loaded zone and a return zone with a plurality of balls distributed in said raceways, the improvement wherein said cage comprises a plurality of axially-extending cage sections which are positioned circumferentially adjacent to each other and are each displaceable relative to adjacent cage sections in the circumferential direction, a typical pair of adjacent cage sections having respectively a pair of first and second adjacent edges extending generally axially, said first and second edges comprising respectively a pair of first and second circumferentially extending and overlying engaging surfaces, thereby forming a seal between said pair of first and second edges, said first and second edges further comprising respectively third and fourth surfaces circumferentially spaced and defining therebetween a gap extending circumferentially and axially, the circumferential dimension of said gap being variable upon relative displacement of said cage sections.

2. A ball bearing according to claim 1 wherein each of said cage sections includes a loaded zone and a return zone of one endless raceway.

3. A ball bearing according to claim 1, wherein said return zones each comprise an axial wall, and said cage further comprises an axial rib extending generally outwardly from at least a first of said cage sections at least partially into one of said return zones for engaging the axial wall thereof which thereby limits rotation of said first cage section.

4. A bearing according to claim 1, wherein said third surface of said first cage extends transversely and intersecting said first surface, thereby defining a first step, and said fourth and second surfaces of said second edge define a second step corresponding to said first step.

5. A bearing according to claim 4, wherein said first and second edges each comprise at least two of said steps positioned successively.

6. A bearing according to claim 1, further comprising an end ring secured at each end of the bearing to the outer sleeve, each end ring including a plurality of turn-around zones, each turn-around zone connecting the adjacent ends of a pair of loaded and return zones.

7. A ball bearing according to claim 6 wherein said outer sleeve includes at each end an annular groove, facing radially outward, and each end-ring further comprises an annular projection extending radially inward for engaging said annular groove and securing said ring to said sleeve.

8. In a linear-motion ball bearing including an outer sleeve about a central axis, a cage within said sleeve, the outer sleeve and cage being concentric circular cylinders, and a plurality of endless raceways defined by said sleeve and cage, each raceway including a loaded zone and a return zone with a plurality of balls distributed in said raceways, the improvement wherein said cage comprises a plurality of axially-extending cage sections which are positioned circumferentially adjacent to each other and are each displaceable relative to adjacent cage sections in the circumferential direction, a typical pair of adjacent cage sections having respectively a pair of first and second adjacent edges extending generally axially, said first and second edges comprising respectively a pair of surfaces which are circumferentially spaced apart and define therebetween a gap extending circumferentially and axially, the circumferential dimension of the gap being variable upon relative displacement of said cage sections.

9. A bearing according to claim 8, wherein said first and second adjacent edges have outer and inner parts located radially outward and inward respectively relative to said axis, said cage further comprising a strip connecting said inner parts of each pair of adjacent edges, said cage sections and connecting strips all being a one-piece construction.

10. A ball bearing according to claim 9 wherein each of said strips is elastic.

* * * * *

UNITED STATES PATENT AND TRADEMARK OFFICE
CERTIFICATE OF CORRECTION

PATENT NO. : 4,205,885

DATED : June 3, 1980

INVENTOR(S) : H.M.Ernst, et al

It is certified that error appears in the above—identified patent and that said Letters Patent are hereby corrected as shown below:

Column 4, line 2, change "cage" to --edge--.

Signed and Sealed this

Seventh Day of October 1980

[SEAL]

Attest:

SIDNEY A. DIAMOND

Attesting Officer

Commissioner of Patents and Trademarks